(12) United States Patent
Jeon et al.

(10) Patent No.: US 11,170,713 B2
(45) Date of Patent: Nov. 9, 2021

(54) DISPLAY DEVICE, ELECTRONIC DEVICE HAVING THE SAME AND DRIVING METHOD OF THE SAME

(71) Applicant: Samsung Display Co., Ltd., Yongin-si (KR)

(72) Inventors: Jae-Hyeon Jeon, Seoul (KR); Jihye Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/711,755

(22) Filed: Dec. 12, 2019

(65) Prior Publication Data

US 2020/0243007 A1  Jul. 30, 2020

(30) Foreign Application Priority Data

Jan. 30, 2019 (KR) .......................... 10-2019-0011572

(51) Int. Cl.
*G09G 3/3233* (2016.01)
*G09G 5/14* (2006.01)
*G09G 3/36* (2006.01)

(52) U.S. Cl.
CPC .......... *G09G 3/3233* (2013.01); *G09G 5/14* (2013.01); *G09G 3/3648* (2013.01); *G09G 2300/0809* (2013.01); *G09G 2310/08* (2013.01); *G09G 2320/0295* (2013.01); *G09G 2320/045* (2013.01); *G09G 2380/02* (2013.01)

(58) Field of Classification Search
None
See application file for complete search history.

(56) References Cited

U.S. PATENT DOCUMENTS

| 2014/0132553 | A1* | 5/2014 | Park | G06F 3/047 345/174 |
| 2014/0139447 | A1* | 5/2014 | Kang | G06F 3/0446 345/173 |
| 2016/0109973 | A1* | 4/2016 | Kim | G06F 3/0488 345/173 |
| 2016/0284272 | A1* | 9/2016 | Her | G09G 3/3233 |

FOREIGN PATENT DOCUMENTS

| KR | 10-2016-0032099 A | 3/2016 |
| KR | 10-2017-0005019 A | 1/2017 |
| KR | 10-2018-0060232 A | 6/2018 |

* cited by examiner

*Primary Examiner* — Ifedayo B Iluyomade
(74) *Attorney, Agent, or Firm* — Lewis Roca Rothgerber Christie LLP

(57) ABSTRACT

A display device includes a foldable display panel including first and second display areas configured to fold along a folding axis extending in a first direction, a first sensing line coupled to pixels in the first display area, and a second sensing line coupled to pixels in the second display area, a sensing unit coupled to the first and second sensing lines, and configured to generate first and second sensing data by sensing current of the pixels coupled to the first sensing line and to the second sensing line, and a timing controller configured to generate compensation data provided to the pixels in the first and second display areas based on the first and second sensing data, respectively, wherein the first and second sensing lines extend in a second direction that is substantially perpendicular to the first direction, and wherein the first and second sensing lines are alternately arranged.

14 Claims, 7 Drawing Sheets

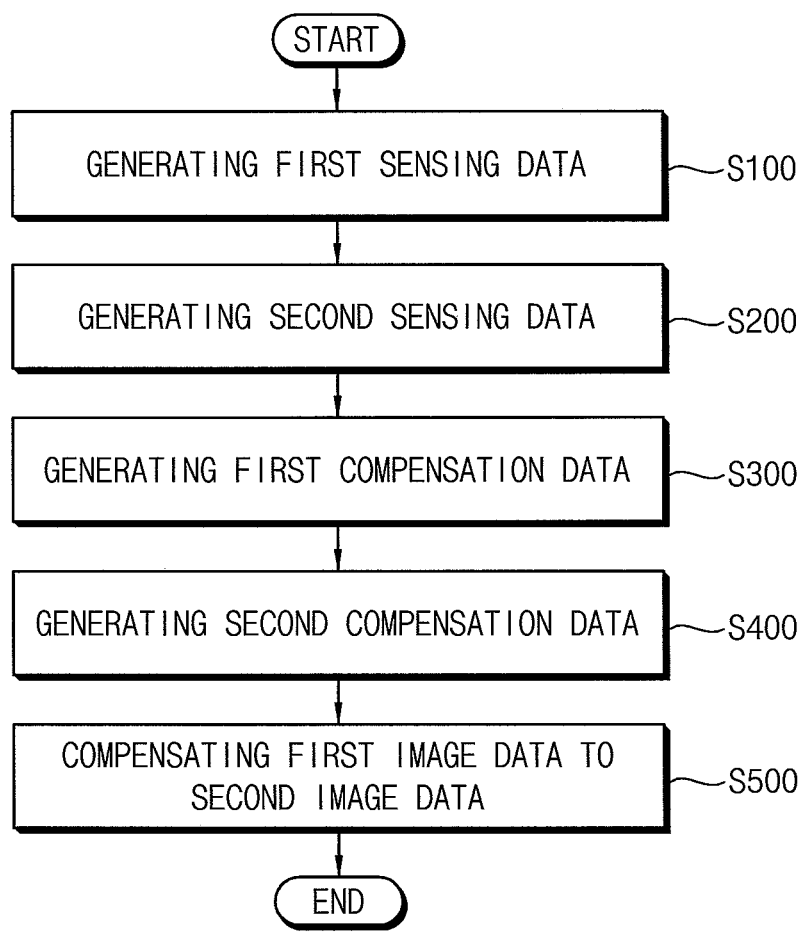

DISPLAY DEVICE, ELECTRONIC DEVICE HAVING THE SAME AND DRIVING METHOD OF THE SAME

CROSS-REFERENCE TO RELATED APPLICATION

This application claims priority to, and the benefit of, Korean Patent Application No. 10-2019-0011572, filed on Jan. 30, 2019 in the Korean Intellectual Property Office (KIPO), the contents of which are incorporated herein in its entirety by reference.

BACKGROUND

1. Field

Embodiments relate generally to a display device, an electronic device having the same, and a driving method of the same.

2. Description of the Related Art

Recently, flat panel display (FPD) devices are widely used as a display device of electronic devices because FPD devices are relatively lightweight and thin compared to cathode-ray tube (CRT) display device. Examples of FPD devices are liquid crystal display (LCD) devices, field emission display (FED) devices, plasma display panel (PDP) devices, and organic light emitting display (OLED) devices.

A foldable display device using a flexible display panel has been developed. The foldable display device can be folded or unfolded, such that the foldable display device is portable. When the foldable display device is folded, a frequency of use of a part of the display panel may be increased. Therefore, there is a problem that degradation of pixels located in one or more parts of the display panel may be increased or intensified.

SUMMARY

Some embodiments provide a display device capable of improving display quality. Some embodiments provide an electronic device capable of improving display quality. Some embodiments provide a driving method of a display device capable of improving display quality.

According to an aspect of embodiments, a display device may include a foldable display panel including a first display area and a second display area that are configured to be folded along a folding axis extending in a first direction, a first sensing line coupled to pixels in the first display area, and a second sensing line coupled to pixels in the second display area, a sensing unit coupled to the first sensing line and to the second sensing line, and configured to generate first sensing data by sensing current of the pixels coupled to the first sensing line, and to generate second sensing data by sensing current of the pixels coupled to the second sensing line, and a timing controller configured to generate compensation data provided to the pixels in the first display area and to the pixels in the second display area based on the first sensing data and the second sensing data, respectively, wherein the first sensing line and the second sensing line extend in a second direction that is substantially perpendicular to the first direction, and wherein the first sensing line and the second sensing line are alternately arranged.

The first sensing line may be coupled to pixels arranged in a (2N−1)th line among the pixels in the first display area, N being an integer equal to or greater than 1, and the second sensing line may be coupled to pixels arranged in a (2N)th line among the pixels in the second display area.

The first sensing line may be coupled to some pixels arranged in a (2N−1)th line among the pixels in the first display area, N being an integer equal to or greater than 1, and the second sensing line may be coupled to some pixels in a (2N)th line among the pixels in the second display area.

The timing controller may include a lookup table for storing the compensation data corresponding to the first sensing data and the second sensing data.

The timing controller may be configured to compensate first image data provided from an external device based on the compensation data to generate second image data.

The sensing unit may be configured to sense the current of the pixels coupled to the first sensing line and the current of the pixels coupled to the second sensing line when the display device turns on.

The sensing unit may be configured to sense the current of the pixels coupled to the first sensing line and the current of the pixels coupled to the second sensing line when the display device turns off.

According to an aspect of embodiments, an electronic device may include a display device and a processor that controls the display device. The display device may include a foldable display panel including a first display area and a second display area that are configured to be folded along a folding axis extending in a first direction, a first sensing line coupled to pixels in the first display area, and a second sensing line coupled to pixels in the second display area, a sensing unit coupled to the first sensing line and the second sensing line, and configured to generate first sensing data by sensing current of the pixels coupled to the first sensing line, and to generate second sensing data by sensing current of the pixels coupled to the second sensing line, and a timing controller configured to generate compensation data provided to the pixels in the first display area and to the pixels in the second display area based on the first sensing data and the second sensing data, respectively, wherein the first sensing line and the second sensing line extend in a second direction that is substantially perpendicular to the first direction, and wherein the first sensing line and the second sensing line are alternately arranged.

The first sensing line may be coupled to pixels arranged in a (2N−1)th line among the pixels in the first display area, N being an integer equal to or greater than 1, and the second sensing line may be coupled to pixels arranged in a (2N)th line among the pixels in the second display area.

The first sensing line may be coupled to some pixels arranged in a (2N−1)th line among the pixels in the first display area, N being an integer equal to or greater than 1, and the second sensing line may be coupled to some pixels in a (2N)th line among the pixels in the second display area.

The timing controller may include a lookup table for storing the compensation data corresponding to the first sensing data and the second sensing data.

The timing controller may be configured to compensate first image data provided from an external device based on the compensation data to generate second image data.

The sensing unit may be configured to sense the current of the pixels coupled to the first sensing line and the current of the pixels coupled to the second sensing line when the display device turns on.

The sensing unit may be configured to sense the current of the pixels coupled to the first sensing line and the current of the pixels coupled to the second sensing line when the display device turns off.

According to an aspect of embodiments, a driving method of a display device that includes a first display area and a second display area that are configured to be folded along a folding axis extending in a first direction, a first sensing line coupled to pixels located in the first display area, and a second sensing line coupled to pixels located in the second display area. The driving method of the display device may include an operation of generating first sensing data by sensing current of the pixels in the first display area through the first sensing line, generating second sensing data by sensing current of the pixels in the second display area through the second sensing line, generating first compensation data provided to the pixels in the first display area based on the first sensing data, generating second compensation data provided to the pixels in the second display area based on the second sensing data, and compensating first image data to generate second image data based on the first compensation data and the second compensation data.

The first sensing line and the second sensing line may extend in a second direction that is substantially perpendicular to the first direction, and the first sensing line and the second sensing line may be alternately arranged.

The first sensing line may be coupled to pixels arranged in a (2N−1)th line among the pixels in the first display area, N being an integer equal to or greater than 1, and the second sensing line may be coupled to pixels arranged in a (2N)th line among the pixels in the second display area.

The first sensing line may be coupled to some pixels arranged in a (2N−1)th line among the pixels in the first display area, N being an integer equal to or greater than 1, and the second sensing line may be coupled to some pixels in a (2N)th line among the pixels in the second display area.

The driving method may further include sensing, by a sensing unit of the display device, the current of the pixels coupled to the first sensing line and the current of the pixels coupled to the second sensing line when the display device turns on.

The driving method may further include sensing, by a sensing unit of the display device, the current of the pixels coupled to the first sensing line and the current of the pixels coupled to the second sensing line when the display device turns off.

Therefore, the display device of embodiments of the present disclosure may improve a difference of the display quality between the first display area and the second display area otherwise caused by a difference of degradations of the pixels by forming the first sensing line coupled to the pixels in the first display area and the second sensing line coupled to the pixels in the second display area, generating first sensing data and the second sensing data corresponding to the current of the pixels sensed through the first sensing line and the second sensing line, and generating the compensation data of the first display area and the second display area based on the first sensing data and the second sensing data.

BRIEF DESCRIPTION OF THE DRAWINGS

Illustrative, non-limiting embodiments will be more clearly understood from the following detailed description taken in conjunction with the accompanying drawings.

FIG. 7 is a flow chart illustrating a driving method of a display device according to one or more embodiments of the present disclosure.

DETAILED DESCRIPTION

Figure 1:
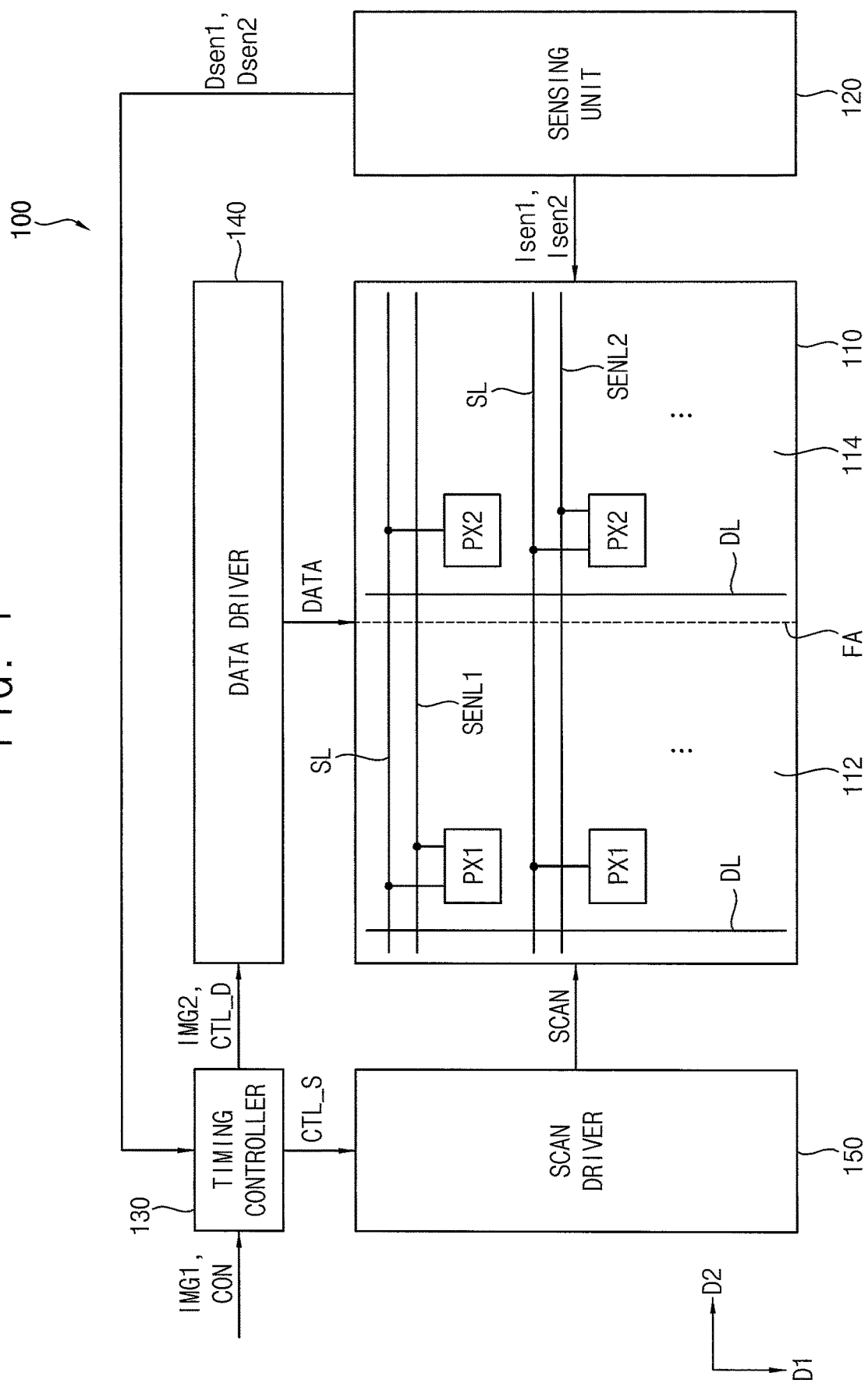
FIG. 1 is a block diagram illustrating a display device according to one or more embodiments of the present disclosure.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to one or more embodiments of the present disclosure of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2A:
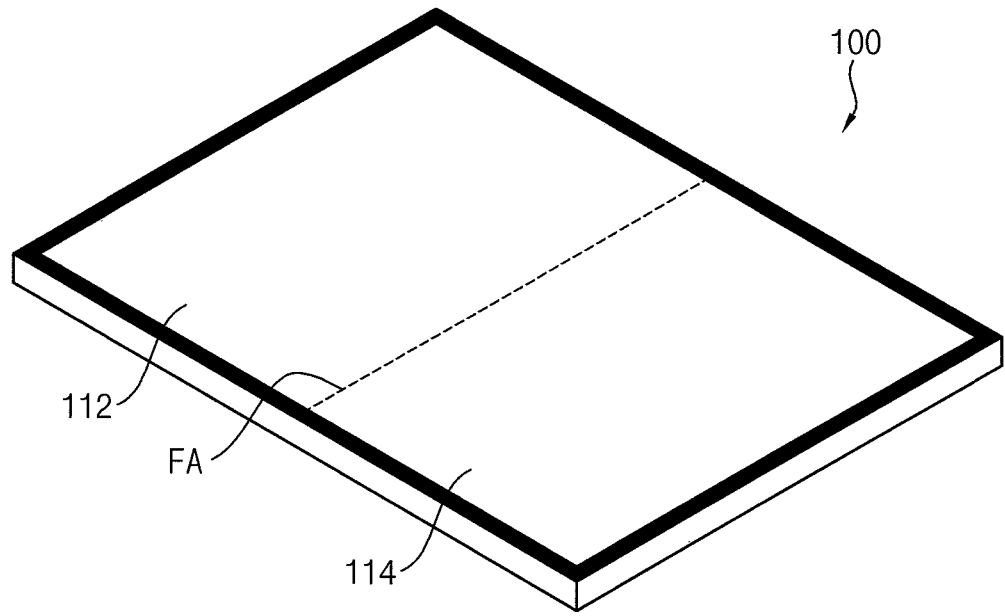
FIGS. 2A and 2B are diagrams illustrating the display device of FIG. 1.
Figure 2B:
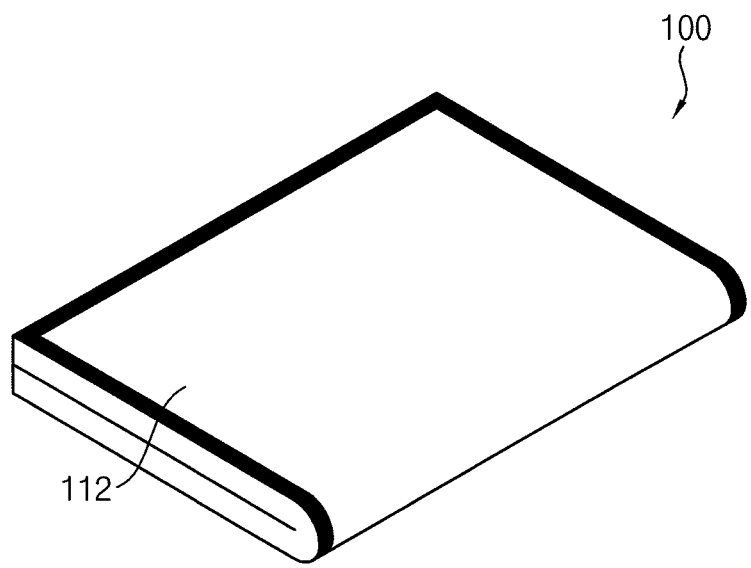

FIG. 1 is a block diagram illustrating a display device according to one or more embodiments of the present disclosure, and FIGS. 2A and 2B are diagrams illustrating the display device of FIG. 1.

Referring to FIG. 1, a display device 100 may include a foldable display panel 110, a sensing unit 120, a timing controller 130, a data driver 140, and a scan driver 150.

The foldable display panel 110 may include a plurality of pixels PX. A plurality of data lines DL and a plurality of scan lines SL may be formed in the foldable display panel 110. The data lines DL may extend in a first direction D1, and may be arranged in a second direction D2 that is substantially perpendicular to the first direction D1. The scan lines SL may extend in the second direction D2, and may be arranged in the first direction D1. The first direction D1 may be parallel with a short side of the foldable display panel 110 and the second direction D2 may be parallel with a long side of the foldable display panel 110.

In some embodiments, each of the pixels PX may include a thin film transistor electrically coupled to the data line DL and the scan line SL, a liquid crystal capacitor, and a storage capacitor coupled to the thin film transistor. Here, the foldable display panel 110 may be a liquid crystal display panel, and the display device 100 may be a liquid crystal display device.

In other embodiments, each of the pixels PX may include a thin film transistor electrically coupled to the data line DL and the scan line SL, a driving transistor, and a storage capacitor coupled to the thin film transistor. Here, the foldable display panel 110 may be an organic light emitting display panel, and the display device 100 may be an organic light emitting display device.

The foldable display panel 110 may include a first display area 112 and a second display area 114, which are configured to be folded with respect to each other along a folding axis extending in the first direction D1. Referring to FIGS. 2A and 2B, the display device 100 that includes the foldable display panel 110 may be folded or unfolded. When the display device 100 is unfolded, an image may be displayed on the first display area 112 and the second display area 114, as shown in FIG. 2A. When the display device 100 is folded, an image may be displayed on one of the first display area 112 and the second display area 114, as shown in FIG. 2B.

Degradation of the pixels PX included in the area on which the image is displayed may be intensified as the number of images displayed on one of the first display area 112 and the second display area 114 increases. In this case, there is a problem that the display quality of the first display area 112 and the display quality of the second display area 114 are different because respective degrees of the degradations of the pixels PX in the first display area 112 and the second display area 114 are different.

The display device 100 according to one or more embodiments of the present disclosure may improve the difference of the display quality of the first display area 112 and the second display area 114 due to the difference of the degradations of the pixels PX by including a first sensing line SENL1 coupled to the pixels PX located in the first display area 112, and a second sensing line SENL2 coupled to the pixels PX located in the second display area 114, and by respectively generating compensating data of the first display area 112 and the second display area 113 based on currents Isen1 and Isen2 of the pixels PX sensed through the first sensing line SENL1 and the second sensing line SENL2.

The foldable display panel 110 may include the first sensing line SENL1 and the second sensing line SENL2. The first sensing line SENL1 and the second sensing line SENL2 may extend in the second direction D2. The first sensing line SENL1 and the second sensing line SENL2 may be alternately arranged. The first sensing line SENL1 may be coupled to the pixels PX in the first display area 112, and the second sensing line SENL2 may be coupled to the pixels PX in the second display area 114.

In some embodiments, the first sensing line SENL1 may be coupled to the pixels PX arranged in a (2N−1)th line among the pixels in the first display area 112, and the second sensing line SENL2 may be coupled to the pixels PX arranged in a (2N)th line among the pixels in the second display area 114. In other embodiments, the first sensing line SENL1 may be coupled to some part of pixels arranged in the (2N−1)th line, and the second sensing line SENL2 may be coupled to some part of the pixels arranged in the (2N)th line.

The sensing unit 120 may be coupled to the first sensing line SENL1 and the second sensing line SENL2. The sensing unit 120 may generate first sensing data Dsen1 by sensing current of the pixels PX coupled to the first sensing line SENL1, and may generate second sensing data Dsen2 by sensing current of the pixels PX coupled to the second sensing line SENL2.

For example, the sensing unit 120 may include an analog digital converter (DAC). The sensing unit may convert a first current Isen1 of the pixels PX coupled to the first sensing line SENL1, and a second current Isen2 of the pixels PX coupled to the second sensing line SENL2, which are analog data, respectively to the first sensing data Dsen1 and the second sensing data Dsen2, which are digital data. In some embodiments, the sensing unit 120 may sense the first current Isen1 of the pixels PX coupled to the first sensing line SENL1, and the second current Isen2 of the pixels PX coupled to the second sensing line SENL2, when the display device 100 turns on. In other embodiments, the sensing unit 120 may sense the first current Isen1 of the pixels PX coupled to the first sensing line SENL1, and the second current Isen2 of the pixels PX coupled to the second sensing line SENL2, when the display device 100 turns off. The sensing unit 120 may provide the first sensing data Dsen1 and the second sensing data Dsen2 to the timing controller 130.

The timing controller 130 may respectively generate compensation data provided to the pixels PX in the first display area 112 and to the pixels in the second display area 114 based on the first sensing data Dsen1 and the second sensing data Dsen2. For example, the timing controller 130 may include a lookup table (LUT) that stores the compensation data corresponding to the first sensing data Dsen1 and the second sensing data Dsen2. The compensation data may be data for compensating the current of the pixel PX decreased due to a degradation of the pixel PX. The timing controller 130 may respectively generate first compensation data applied to the pixels PX in the first display area 112, and second compensation data applied to the pixels PX in the second display area 114, because speeds of the degradation of the pixels PX in the first display area 112 and the second display area 114 are different.

The timing controller 130 may receive first image data IMG1 from an external device. The timing controller 130 may generate second image data IMG2 by compensating the first image data IMG1 provided form the external device. The timing controller 130 may generate the second image data IMG2 by respectively applying the first compensation data and the second compensation data to the first image data IMG1.

For example, the timing controller 130 may generate the second image data IMG2 provided to the first display area 112 by adding the first compensation data to the first image data IMG1 provided to the pixels PX in the first display area 112, and may generate the second image data IMG2 provided to the second display area 114 by adding the second compensation data to the first image data IMG1 provided to the pixels PX in the second display area 114. The timing controller 130 may provide the second image data IMG2 to the data driver 140.

The timing controller 130 may receive a control signal CON form the external device. The timing controller 130 may generate a scan control signal CTL_S and a data control signal CTL_D, which control a driving timing of the second image data IMG2 based on the control signal CON. For example, the scan control signal CTL_S may include a vertical start signal and at least one scan clock signal, and the data control signal CTL_D may include a horizontal start signal and a data clock signal. The timing controller 130 may provide the scan control signal CTL_S to the scan driver 150, and may provide the data control signal CTL_D to the data driver 140.

The data driver 140 may provide a data signal DATA to the pixels PX. The data driver 140 may receive the second image data IMG2 and the data control signal CTL_D from the timing controller 130. The data driver 140 may convert the second image data IMG2 to an analog signal according to the data control signal CTL_D, and may provide the analog signal to the data lines DL as the data signal DATA.

The scan driver 150 may provide the scan signal SCAN to the pixels PX. The scan driver 150 may receive the scan control signal CTL_S from the timing controller 130. The scan driver 150 may generate the scan signal SCAN based on the scan control signal CTL_S, and may sequentially provide the scan signal SCAN to the scan lines SL formed in the foldable display panel 110. The scan driver 150 may be formed substantially simultaneously with transistors of the pixels PX. The scan driver 150 may be formed in the foldable display panel 110 as an amorphous silicon TFT gate driver circuit (ASG) or an oxide silicon TFT gate driver circuit (OSG). Alternatively, the scan driver 150 may be formed as a plurality of driving chips, may be implemented as a chip on film (COF) in which the driving chips are mounted on a flexible printed circuit board (FPCB), and/or may be coupled to the foldable display panel 110 through the FPCB.

As described above, the display device 100 according to one or more embodiments of the present disclosure may improve the difference of the display quality between the first display area 112 and the second display area 114 caused by differing degrees of degradation of the pixels PX by including a foldable display panel 110 that includes a first sensing line SENL1 coupled to the pixels PX in the first display area 112, and a second sensing line SENL2 coupled to the pixels PX in the second display area 114, the sensing unit 120 that generates the first sensing data Dsen1 and the second sensing data Dsen2 corresponding to the current of the pixels PX sensed through the first sensing line SENL1 and the second sensing line SENL2, and the timing controller 130 that respectively generates the compensation data of the first display area 112 and the second display area 114 based on the first sensing data Dsen1 and the second sensing data Dsen2.

Figure 3:
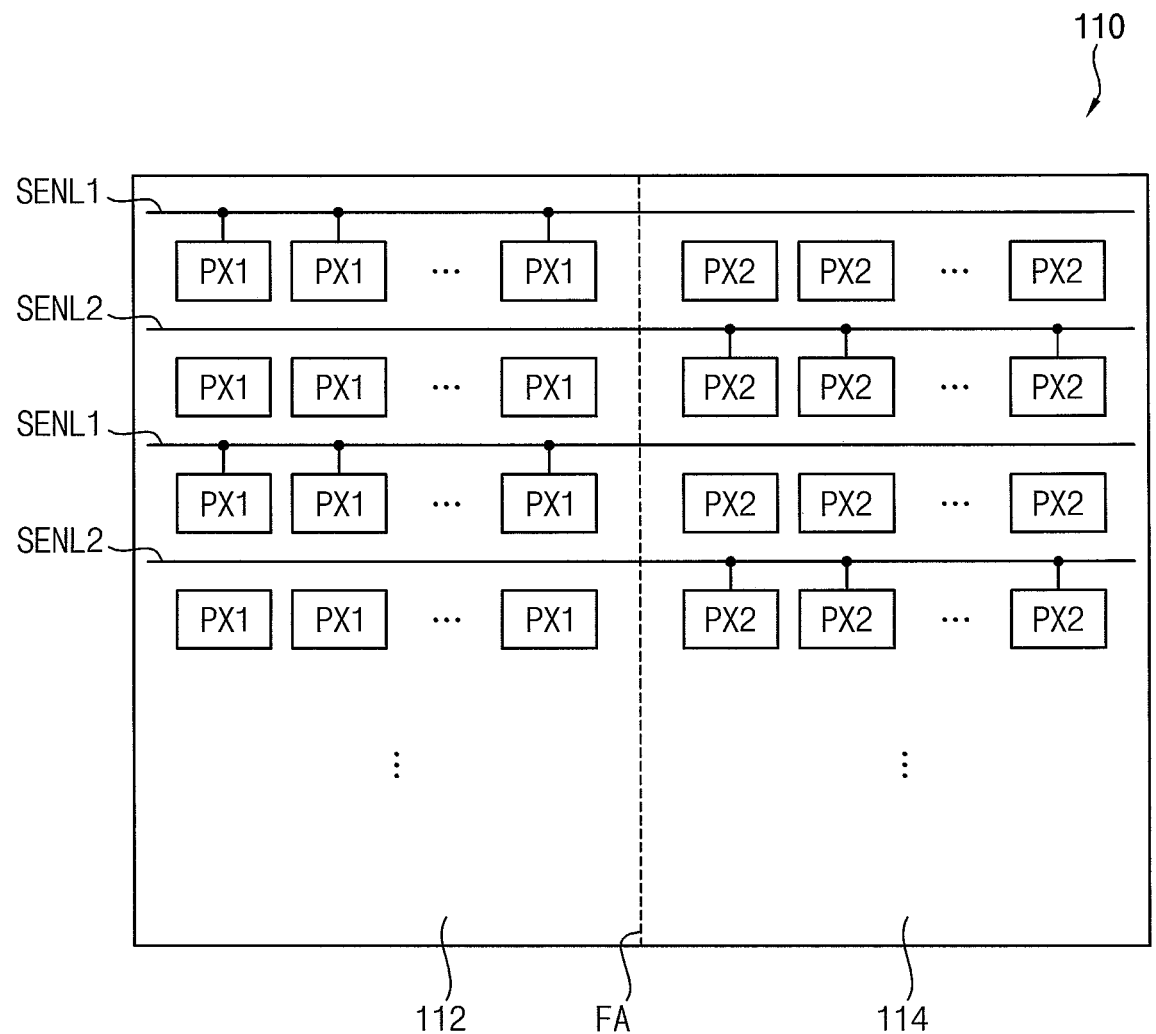
FIG. 3 is a diagram illustrating an example of a foldable display panel included in the display device of FIG. 1.
Figure 4:
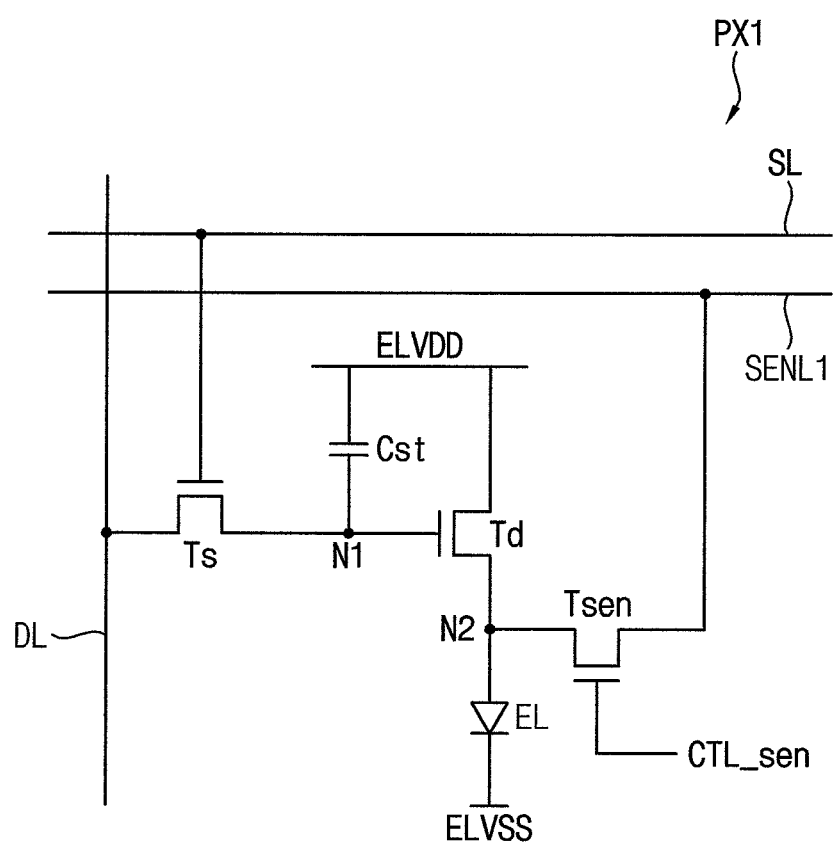
FIG. 4 is a circuit diagram illustrating an example of a pixel included in the foldable display panel of FIG. 3.

FIG. 3 is a diagram illustrating an example of a foldable display panel included in the display device of FIG. 1, and FIG. 4 is a circuit diagram illustrating an example of a pixel included in the foldable display panel of FIG. 3.

Referring to FIG. 3, the foldable display panel 110 may include the folding axis FA extending in the first direction D1. The foldable display panel 110 may be folded or unfolded along the folding axis FA. The foldable display panel 110 may include the first display area 112 and the second display area 114.

The first display area 112 and the second display area 114 may be divided along, or may be separated by, the folding axis FA. First pixels PX1 may be formed in the first display area 112, and second pixels PX2 may be formed in the second display area 114. The first pixel PX1 and the second pixel PX2 may have the same structure and the same function.

Referring to FIG. 4, the first pixel PX1 may include a driving transistor Td, a switching transistor Ts, a sensing transistor Tsen, a storage capacitor Cst, and an organic light emitting diode EL.

The driving transistor Td may have a gate electrode coupled to a first node N1, a first electrode coupled to a first power line through which a first power voltage ELVDD is provided, and a second electrode coupled to a second node N2. The driving transistor Td may turn on in response to a voltage applied to the first node N1. When the driving transistor Td turns on, the driving transistor Td may generate a driving current corresponding to a data signal (e.g., the data voltage), and may provide the driving current to the organic light emitting diode EL.

The switching transistor Ts may include a gate electrode coupled to the scan line SL, a first electrode coupled to the data line DL, and a second electrode coupled to the first node N1. The switching transistor Ts may turn on in response to the scan signal provided to the gate electrode. When the switching transistor Ts turns on, the data signal (e.g., the data voltage) provided through the data line DL may be provided to the first node N1.

The storage capacitor Cst may include a first electrode coupled to the first power line, and a second electrode coupled to the first node N1. The storage capacitor may store the data signal provided through the switching transistor Ts.

The organic light emitting diode EL may include a first electrode coupled to the second node N2, and a second electrode coupled to a second power line through which a second power voltage ELVSS is provided. The organic light emitting diode EL may emit light in response to the driving current provided from the driving transistor Td.

The sensing transistor Tsen may include a gate electrode that receives a sensing control signal CTL_sen, a first electrode coupled to the second node N2, and a second electrode coupled to the first sensing line SENL1. The sensing transistor Tsen may receive the sensing control signal CTL_sen from the sensing unit or the timing controller. The sensing control signal CTL_sen may be provided when the display device turns on and/or turns off. The sensing transistor Tsen may turn on in response to the sensing control signal CTL_sen. When the sensing transistor Tsen turns on, the driving current flowing through the second node N2 may be transferred to the first sensing line SENL1.

The second pixel PX2 may have substantially the same structure with the first pixel PX1, with the exception that a second electrode of the sensing transistor Tsen is coupled to the second sensing line SENL2. The sensing transistor Tsen of the second pixel PX2 may transfer the driving current to the second sensing line SENL2.

Referring to FIG. 3, the foldable display panel 110 may include the first sensing line SENL1 and the second sensing line SENL2. The first sensing line SENL1 and the second sensing line SENL2 may extend in the second direction D2, which is substantially perpendicular to the first direction D1. That is, the first sensing line SENL1 and the second sensing line SENL2 may be formed in a direction that is substantially perpendicular to the folding axis FA. The first sensing line SENL1 may be coupled to the first pixels PX1 formed in the first display area 112, and the second sensing line SENL2 may be coupled to the second pixels PX2 formed in the second display area 114. The first sensing line SENL1 and the second sensing line SENL2 may be alternately arranged.

For example, the first sensing line SENL1 may be coupled to the first pixels PX1 arranged in a (2N−1)th line among the first pixels PX1, and the second sensing line SENL2 may be coupled to the second pixels PX2 arranged in a (2N)th line among the second pixels PX2, where the N is an integer equal to or greater than 1.

In some embodiments, the first sensing line SENL1 may be coupled to all of the first pixels PX1 arranged in the (2N−1)th line, and the second sensing line SENL2 may be coupled to all of the second pixels PX2 arranged in the (2N)th line. In this case, the driving current flowing through the first pixels PX1 of the first display area 112 and the second pixels PX2 of the second display area 114 may be sensed in detail.

In other embodiments, the first sensing line SENL1 may be coupled to some of the first pixels PX1 arranged in the (2N−1)th line, and the second sensing line SENL2 may be coupled to some of the second pixels PX2 arranged in the (2N)th line. In this case, time for sensing the driving current flowing through the first pixels PX1 of the first display area 112 and the second pixels PX2 of the second display area 114 may be decreased.

As described above, the foldable display panel 110 included in the display device according to one or more embodiments of the present disclosure may respectively sense the driving current of the first pixels PX1 in the first display area 112 and the driving current of the second pixels PX2 in the second display area 114 by dividing the foldable display panel 110 in the first display area 112 and the second display area 114 along the folding axis FA, and by respectively coupling the first sensing line SENL1 and the second sensing line SENL2 perpendicular to the folding axis FA to the first pixels PX1 and the second pixels PX2. Thus, the degradation of the first pixels PX1 in the first display area 112 and the degradation of the second pixels PX2 in the second display area 114 may be respectively detected.

Figure 5:
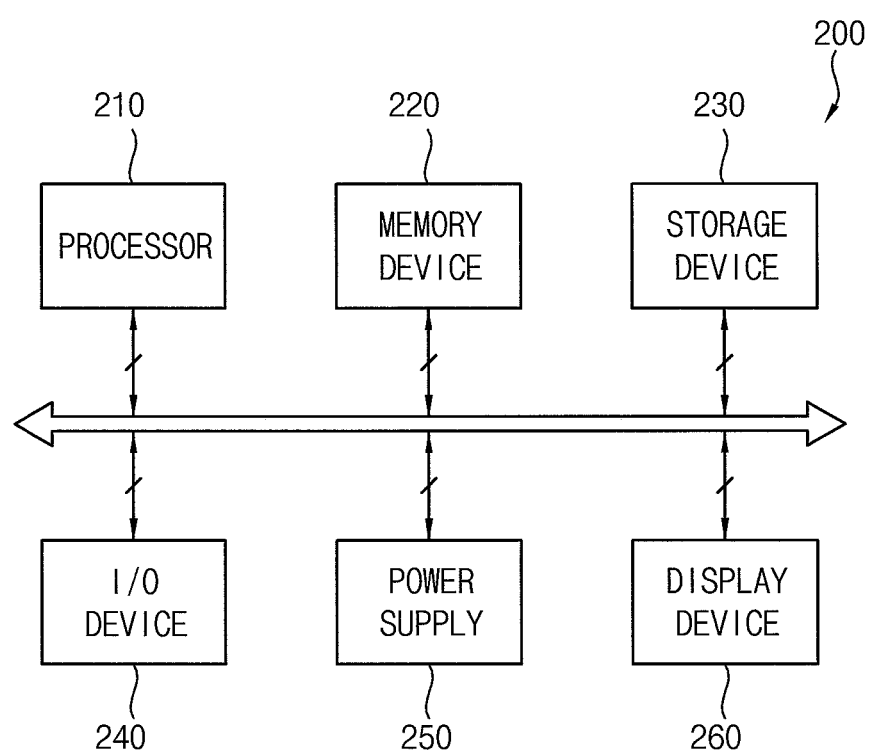
FIG. 5 is a block diagram illustrating an electronic device according to one or more embodiments of the present disclosure.
Figure 6:
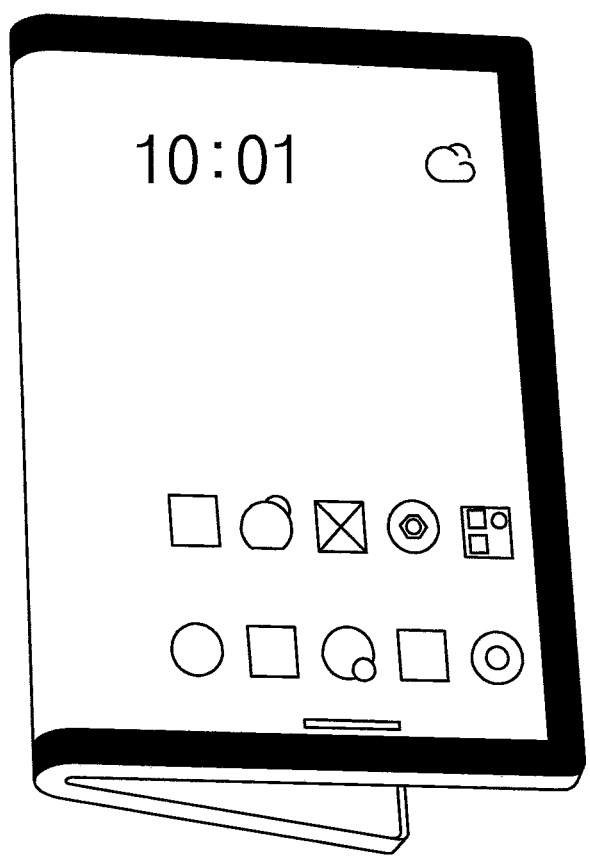
FIG. 6 is a diagram illustrating an embodiment in which the electronic device of FIG. 5 is implemented as a smart phone.

FIG. 5 is a block diagram illustrating an electronic device according to one or more embodiments of the present disclosure, and FIG. 6 is a diagram illustrating an embodiment in which the electronic device of FIG. 5 is implemented as a smart phone.

Referring to FIGS. 5 and 6, an electronic device 200 may include a processor 210, a memory device 220, a storage device 230, an input/output (I/O) device 240, a power device 250, and a display device 260. Here, the display device 260 may correspond to the display device 100 of FIG. 1. In addition, the electronic device 200 may further include a plurality of ports for communicating WITH a video card, a sound card, a memory card, a universal serial bus (USB) device, other electronic device, etc. Although it is illustrated in FIG. 6 that the electronic device 200 is implemented as a smart phone 300, a kind of the electronic device 200 is not limited thereto.

The processor 210 may perform various computing functions. The processor 210 may be a microprocessor, a central processing unit (CPU), etc. The processor 210 may be coupled to other components via an address bus, a control bus, a data bus, etc. Further, the processor 210 may be coupled to an extended bus such as a surrounded component interconnect (PCI) bus. The memory device 220 may store data for operations of the electronic device 200. For example, the memory device 220 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc. The storage device 230 may be a solid stage drive (SSD) device, a hard disk drive (HDD) device, a CD-ROM device, etc.

The I/O device 240 may be an input device such as a keyboard, a keypad, a touchpad, a touch-screen, a mouse, etc., and an output device such as a printer, a speaker, etc. In some embodiments, the display device 260 may be included in the I/O device 240. The power device 250 may provide a power for operations of the electronic device 200. The display device 260 may communicate with other components via the buses or other communication links.

As described above, the display device 260 may include a foldable display panel, a sensing unit, a timing controller, a data driver, and a scan driver.

The foldable display panel may include a plurality of pixels. The foldable display panel may include a first display area and a second display area that are folded along, or with respect to, a folding axis extending in a first direction. The foldable display panel may include a first sensing line and a second sensing line.

The first sensing line and the second sensing line may extend in a second direction perpendicular to the first direction. Further, the first sensing line and the second sensing line may be alternately arranged in the first direction. The first sensing line may be coupled to the pixels in the first display area, and the second sensing line may be coupled to the pixels in the second display area.

In some embodiments, the first sensing line may be coupled to the pixels arranged in a (2N−1)th line among the pixels in the first display area, and the second sensing line may be coupled to the pixels arranged in a (2N)th line among the pixels in the second display area. In other embodiments, the first sensing line may be coupled to only some of the pixels arranged in a (2N−1)th line among the pixels in the first display area, and the second sensing line may be coupled to only some of the pixels arranged in a (2N)th line among the pixels in the second display area.

The sensing unit may be coupled to the first sensing line and the second sensing line. The sensing unit may sense current of the pixels coupled to the first sensing line, and may generate first sensing data. The sensing unit may sense current of the pixels coupled to the second sensing line, and may generate second sensing data. The sensing unit may sense the current of the pixels coupled to the first sensing line and the current of the pixels coupled to the second sensing line when the display device turns on and/or turns off.

The timing controller may respectively generate compensation data provided to the pixels in the first display area and the pixels in the second display area based on the first sensing data and the second sensing data. The timing controller may generate second image data by respectively applying the compensation data to first image data provided from an external device.

The data driver may receive the second image data and a data control signal from the timing controller. The data driver may convert the second image data to an analog signal, and may provide the analog signal to data lines formed in the foldable display panel as a data signal. The scan driver may generate a scan signal based on a scan control signal provided from the timing controller, and may provide the scan signal to scan lines formed in the foldable display panel.

As described above, the electronic device 200 according to one or more embodiments of the present disclosure may include the display device that includes the foldable display panel on which the first sensing line coupled to the pixels in the first display area and the second sensing line coupled to the pixels in the second display area are formed, that generates the first sensing data and the second sensing data corresponding to the current of the pixels sensed through the first sensing line and the second sensing line, and that respectively generates the compensation data of the first display area and the second display area. Thus, a difference of display quality between the first display area and the second display area due to difference of degradations of the pixels may be improved.

FIG. 7 is a flow chart illustrating a driving method of a display device according to one or more embodiments of the present disclosure.

Referring to FIG. 7, a driving method of a display device may include an operation of generating first sensing data S100, an operation of generating second sensing data S200, an operation of generating first compensation data S300, an operation of generating second compensation data S400, and an operation of compensating first image data to second image data S500.

The display device may include a foldable display panel. The foldable display panel may include a plurality of pixels. The foldable display panel may include a first display area and a second display area that are folded along a folding axis extending in a first direction. The foldable display panel may include a first sensing line and a second sensing line. The first sensing line and the second sensing line may extend in a second direction perpendicular to the first direction. Further, the first sensing line and the second sensing line may be alternately arranged. The first sensing line may be coupled to the pixels located in the first display area, and the second sensing line may be coupled to the pixels located in the second display area. In some embodiments, the first sensing line may be coupled to the pixels arranged in a (2N−1)th line among the pixels in the first display area, and the second sensing line may be coupled to the pixels arranged in a (2N)th line among the pixels in the second display area. In other embodiments, the first sensing line may be coupled to some of the pixels arranged in a (2N−1)th line among the pixels in the first display area and the second sensing line may be coupled to some of the pixels arranged in a (2N)th line among the pixels in the second display area.

The driving method of the display device may generate the first sensing data by sensing current of pixels located in the first display area through the first sensing line S100. The display device may include a sensing unit. The sensing unit may sense the current of the pixels coupled to the first sensing line, and may generate the first sensing data when the display device turns on or turns off.

The driving method of the display device may generate the second sensing data by sensing current of pixels located in the second display area through the second sensing line S200. The sensing unit may sense the current of the pixels coupled to the second sensing line, and may generate the second sensing data when the display device turns on or turns off.

The driving method of the display device may generate the first compensation data provided to the pixels located in the first display area based on the first sensing data S300. The display device may include a lookup table that stores the compensation data corresponding to the first sensing data and the second sensing data. The driving method of the display device may generate the first compensation data corresponding to the first sensing data using the lookup table.

The driving method of the display device may generate the second compensation data provided to the pixels located in the second display area based on the second sensing data S400. The driving method of the display device may generate the second compensation data corresponding to the second sensing data using the lookup table.

The driving method of the display device may compensate the first image data to the second image data based on the first compensation data and the second compensation data S500. The display device may receive the first image data. The driving method of the display device may generate the second image data by applying the first compensation data to data corresponding to the first display area among the first image data, and by applying the second compensation data to data corresponding to the second display area among the first image data.

As described above, the driving method of the display device improves a difference of display quality due to degradation of the pixels in the first display area and the second display area by forming the first sensing line coupled to the pixels in the first display area and the second sensing line coupled to the pixels in the second display area, generating the first sensing data and the second sensing data corresponding to the current of the first display area and the second display area sensed through the first sensing line and the second sensing line, generating the first compensation data and the second compensation data based on the first sensing data and the second sensing data, and compensating the first image data to the second image data based on the first compensation data and the second compensation data.

Embodiments of the present disclosure may be applied to a display device and to an electronic device having the display device. For example, the present inventive concept may be applied to a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

The foregoing is illustrative of embodiments, and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims, with functional equivalents thereof to be included.

What is claimed is:

1. A display device comprising:
   a foldable display panel comprising:
      a first display area and a second display area that are configured to be folded along a folding axis extending in a first direction;
      a first sensing line coupled to at least some pixels arranged in a (2N−1)th line among the pixels in the first display area, N being an integer equal to or greater than 1; and
      a second sensing line coupled to at least some pixels arranged in a (2N)th line among the pixels in the second display area;
   a sensing unit coupled to the first sensing line and to the second sensing line, and configured to generate first sensing data by sensing current of the pixels coupled to the first sensing line, and to generate second sensing data by sensing current of the pixels coupled to the second sensing line; and a timing controller configured to generate compensation data provided to the pixels in the first display area and to the pixels in the second display area based on the first sensing data and the second sensing data, respectively, for compensating currents of the pixels of the first and second display areas that are decreased due to degradation of the pixels, wherein the first sensing line and the second sensing line extend in a second direction that is substantially perpendicular to the first direction, and wherein the first sensing line and the second sensing line are alternately arranged.

2. The display device of claim 1, wherein the timing controller comprises a lookup table for storing the compensation data corresponding to the first sensing data and the second sensing data.

3. The display device of claim 1, wherein the timing controller is configured to compensate first image data provided from an external device based on the compensation data to generate second image data.

4. The display device of claim 1, wherein the sensing unit is configured to sense the current of the pixels coupled to the first sensing line and the current of the pixels coupled to the second sensing line when the display device turns on.

5. The display device of claim 1, wherein the sensing unit is configured to sense the current of the pixels coupled to the first sensing line and the current of the pixels coupled to the second sensing line when the display device turns off.

6. An electronic device comprises a display device, and a processor that is configured to control the display device, wherein the display device comprises:

a foldable display panel comprising a first display area and a second display area that are configured to be folded along a folding axis extending in a first direction, a first sensing line coupled to pixels in the first display area, and a second sensing line coupled to pixels in the second display area;

a sensing unit coupled to the first sensing line and the second sensing line, and configured to generate first sensing data by sensing current of the pixels coupled to the first sensing line, and to generate second sensing data by sensing current of the pixels coupled to the second sensing line; and a timing controller configured to generate compensation data provided to the pixels in the first display area and to the pixels in the second display area based on the first sensing data and the second sensing data, respectively, for compensating currents of the pixels of the first and second display areas that are decreased due to degradation of the pixels, wherein the first sensing line and the second sensing line extend in a second direction that is substantially perpendicular to the first direction, wherein the first sensing line and the second sensing line are alternately arranged, wherein the first sensing line is coupled to at least some pixels arranged in a (2N−1)th line among the pixels in the first display area, N being an integer equal to or greater than 1, and wherein the second sensing line is coupled to at least some pixels arranged in a (2N)th line among the pixels in the second display area.

7. The electronic device of claim 6, wherein the timing controller comprises a lookup table for storing the compensation data corresponding to the first sensing data and the second sensing data.

8. The electronic device of claim 6, wherein the timing controller is configured to compensate first image data provided from an external device based on the compensation data to generate second image data.

9. The electronic device of claim 6, wherein the sensing unit is configured to sense the current of the pixels coupled to the first sensing line and the current of the pixels coupled to the second sensing line when the display device turns on.

10. The electronic device of claim 6, wherein the sensing unit is configured to sense the current of the pixels coupled to the first sensing line and the current of the pixels coupled to the second sensing line when the display device turns off.

11. A driving method of a display device that comprises a foldable display panel that comprises a first display area and a second display area that are configured to be folded along a folding axis extending in a first direction, a first sensing line coupled to at least some pixels arranged in a (2N−1)th line among the pixels in the first display area, N being an integer equal to or greater than 1, and a second sensing line coupled to at least some pixels arranged in a (2N)th line among the pixels in the second display area, the driving method of the display device comprising:

generating first sensing data by sensing current of the pixels in the first display area through the first sensing line;

generating second sensing data by sensing current of the pixels in the second display area through the second sensing line;

generating first compensation data provided to the pixels in the first display area based on the first sensing data for compensating currents of the pixels in the first display area that are decreased due to degradation;

generating second compensation data provided to the pixels in the second display area based on the second sensing data for compensating currents of the pixels in the second display area that are decreased due to degradation; and compensating first image data to generate second image data based on the first compensation data and the second compensation data.

12. The driving method of claim 11, wherein the first sensing line and the second sensing line extend in a second direction that is substantially perpendicular to the first direction, and wherein the first sensing line and the second sensing line are alternately arranged.

13. The driving method of claim 11, further comprising sensing, by a sensing unit of the display device, the current of the pixels coupled to the first sensing line and the current of the pixels coupled to the second sensing line when the display device turns on.

14. The driving method of claim 11, further comprising sensing, by a sensing unit of the display device, the current of the pixels coupled to the first sensing line and the current of the pixels coupled to the second sensing line when the display device turns off.

* * * * *